Nov. 19, 1929.  D. W. PYE  1,736,548
VEHICLE FLOOR CONSTRUCTION
Filed Nov. 17, 1926
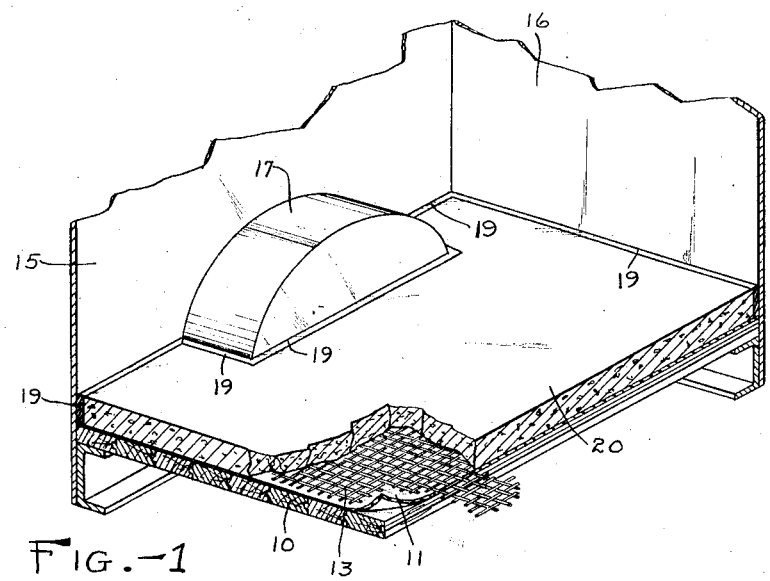
FIG.-1
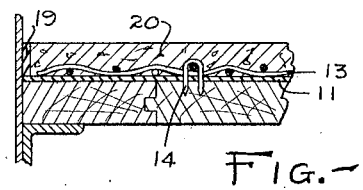
FIG.-2
FIG.-3
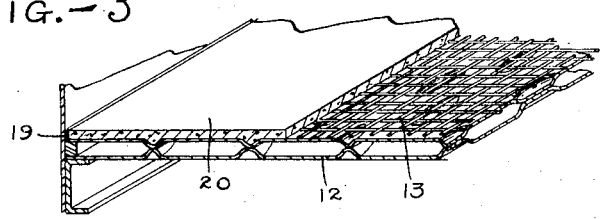
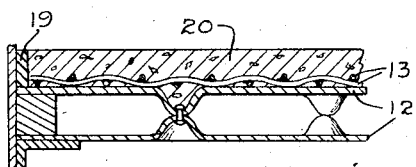
FIG.-4
Inventor
David W Pye
By Bates Macklin Goernck & Pearne
Attorneys Patented Nov. 19, 1929

1,736,548

UNITED STATES PATENT OFFICE

DAVID W. PYE, OF BROOKLYN, NEW YORK

VEHICLE-FLOOR CONSTRUCTION

Application filed November 17, 1926. Serial No. 148,827.

This invention is directed to improvements in floor structures for vehicles and has for its general object the provision of a durable semi-flexible composite floor construction for passenger vehicles.

The development of vehicle bodies of the all metal type is now commercially well advanced, but the introduction of such metal bodies has been accompanied by certain disadvantages including the difficulty or providing a durable semi-flexible floor structure and also the prevalence of squeaks and body rattles which increase upon prolonged use of the vehicle. Wherefore, a more specific object of the present invention is the provision of a composition floor construction which may be semi-flexible in character to respond to the weaving or warping action which takes place in the floors of all metal bodies when in use, but which will not crack and which will remain serviceable without causing squeaks and irritable noises characteristic of the composite floor constructions now in use.

Other objects of my invention will hereinafter become apparent from the following description referring to the accompanying drawings illustrating a preferred form thereof. The essential characteristics are summarized in the claim.

In the drawings Fig. 1 is a fragmentary perspective view of the rear portion of a metallic vehicle body showing my novel floor construction; Fig. 2 is an enlarged cross-sectional detail taken through the floor structure shown in Fig. 1; Fig. 3 is a modified form of composite floor structure embodying certain features of my invention; and Fig. 4 is an enlarged cross-sectional detail of the floor structure shown in Fig. 3.

My invention contemplates the provision of a floor structure surfaced with a hard, wear resisting semi-flexible composition which may be laid upon a sub-floor structure while in plastic condition. Such compositions when laid over the sub-structure of the floor from wall to wall of the body structure are eventually the source of irritating noises and squeaks to the passenger due to the fact that the edges of the composition rub and have an abrasive action upon the steel sheathing of the vehicle walls. This is particularly true when a weaving action takes place in the floor during the movement of the vehicle over an uneven road surface. This rubbing contact between the floor surface and the hard floor covering also frequently causes a crumbling or cracking of the surface material when the floor structure is subjected to the warping action mentioned.

To overcome these difficulties I provide a non-abrasive material in interposed relation to the edges of the surfacing material and the walls of the body which prevents the abrasive action of the composition upon the wall sheathing, and acts as a cushion between the walls and the floor surfacing, and if this material is slightly resilient in character the prevention of lateral compressive stresses in the surfacing material is prevented when the floor of the vehicle is subjected to the warping action mentioned.

In Fig. 1 of the drawings I illustrate the sub-structure of the vehicle floor as comprising the usual wooden sheathing or matched boards 10 supported by suitable studding, not shown, and these boards are covered with a moisture-proofing material such as asphaltum or tar paper 11. Over this moisture-proofing material I prefer to place an anchoring means upon which the surfacing composition may be laid while in a plastic condition and this anchoring means may comprise wire netting 13 secured to the flooring boards 10 by any suitable means such as staples 14.

I then place a border of non-abrasive material of suitable thickness and of a width corresponding to the thickness of the composition surface entirely around and in contact with the walls 15 and 16 of the vehicle body and also around the bottom margins of the "kick up" guard 17 which in modern practice is built up into the body as an integral part thereof. This liner may comprise especially treated paper or any resilient material which can be retained in place and which will resist the abrasive action of the flooring composition 20 when the vehicle is in use.

In Figs. 3 and 4, I show a flooring construction wherein the sub-structure may comprise metal sheathing of the general construction disclosed in the patent to Madison No. 1,277,622 issued September 3, 1918. The wire netting 13 in this construction may be secured to the sub-structure comprising the sheathing 22 by riveting or welding. The composition 20 may then be laid thereover after the liners 19 have been placed above and about the marginal edges of the sheathing 22 and in contact with the walls of the body.

In this construction I prefer to apply a rust proof coating in the form of an asphaltum or tar paint to the metallic floor sheathing and wire, and I omit the use of tar paper.

The construction herein described, has proven to be very satisfactory in service, in that the flooring has developed no fracture nor cracks in the surfacing material thus assuring full protection to the under laying metallic parts of the floor structure. I have not specifically recommended any particular surfacing composition for the reason that there are at present on the market, several flooring cements varying somewhat in their general characteristics, but any one of which would be found to render satisfactory service when combined in the floor structure I herein describe, and wherever I have referred to composition surfacing herein, I mean those forms of surfacing material which can be applied in the plastic state, but upon hardening will retain a semi-flexible characteristic, whereby the complete floor structure readily responds to the weaving and warping action of the vehicle body when in transit.

Floor structure such as I herein set forth, while withstanding such warping action nevertheless does not develop any fractures in the surfacing whatsoever, and further, all irritating noises incident to the use of hard surfacing material in the flooring of metal body vehicles is eliminated.

I claim:

The combination of a vehicle having a metal wall, of a horizontal support therein, a metal wire mesh anchored at intervals to the support, a semi-flexible abrasive composition of surfacing material laid over the wire mesh and embracing it, said composition being of wear resisting abrasive material, and a felt border liner interposed between the material and the walls of the body whereby abrasion of the metal by the semi-flexible floor is prevented.

In testimony whereof, I hereunto affix my signature.

DAVID W. PYE.